US012576872B2

(12) United States Patent
Heijboer et al.

(10) Patent No.: US 12,576,872 B2
(45) Date of Patent: Mar. 17, 2026

(54) DEVICE FOR PRODUCING A SIGNAL WHICH CAN BE HAPTICALLY PERCEIVED BY A USER OF A VEHICLE

(71) Applicant: Bayerische Motoren Werke Aktiengesellschaft, Munich (DE)

(72) Inventors: Stefan Heijboer, Mountain View, CA (US); Stefan Breitschaft, Nabburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 135 days.

(21) Appl. No.: 18/563,339

(22) PCT Filed: Mar. 8, 2022

(86) PCT No.: PCT/EP2022/055874
§ 371 (c)(1),
(2) Date: Nov. 21, 2023

(87) PCT Pub. No.: WO2022/258236
PCT Pub. Date: Dec. 15, 2022

(65) Prior Publication Data
US 2024/0217537 A1      Jul. 4, 2024

(30) Foreign Application Priority Data

Jun. 7, 2021      (DE) ..................... 10 2021 114 523.6

(51) Int. Cl.
B60W 50/16          (2020.01)
B60K 35/10          (2024.01)
(Continued)

(52) U.S. Cl.
CPC ............. B60W 50/16 (2013.01); B60K 35/10 (2024.01); B60K 35/22 (2024.01); B60K 35/25 (2024.01);
(Continued)

(58) Field of Classification Search
CPC ........ B60K 35/10; B60K 35/22; B60K 35/25; B60K 35/60; B60K 35/80;
(Continued)

(56) References Cited

U.S. PATENT DOCUMENTS

| | | | | |
|---|---|---|---|---|
| 10,442,443 B1* | 10/2019 | Li | ......................... | B60W 50/10 |
| 2005/0187684 A1* | 8/2005 | Hijikata | ............... | B60N 2/6009 |
| | | | | 701/1 |

(Continued)

FOREIGN PATENT DOCUMENTS

| | | |
|---|---|---|
| DE | 102005032528 A1 | 1/2007 |
| DE | 102011113054 A1 | 3/2012 |

(Continued)

OTHER PUBLICATIONS

International Search Report corresponding to International Patent Application No. PCT/EP2022/055874, dated Jun. 24, 2022 (6 pages).

(Continued)

*Primary Examiner* — Peter D Nolan
*Assistant Examiner* — Ce Li Li
(74) *Attorney, Agent, or Firm* — Maginot, Moore & Beck LLP

(57)      ABSTRACT

A device for generating a signal which can be haptically perceived by a user of a vehicle includes a control device, a technical device and a storage device. The control device communicates with an external apparatus to receive a triggering signal. The technical device for the vehicle has an actuator for generating the signal which can be haptically perceived. The storage device stores a plurality of different patterns for controlling the actuator depending on user-specific data and/or data relating to an environment of the technical device. The control device uses a selected pattern of the stored patterns depending on the user-specific data (Continued)

400 and/or the data relating to an environment of the technical device, and controls the at least one actuator according to the selected pattern upon receiving the triggering signal from the external apparatus. The data relating to the environment is acquired using an acquisition device.

15 Claims, 1 Drawing Sheet

(51) Int. Cl.

| | |
|---|---|
| *B60K 35/22* | (2024.01) |
| *B60K 35/25* | (2024.01) |
| *B60K 35/60* | (2024.01) |
| *B60K 35/80* | (2024.01) |
| *G06V 20/56* | (2022.01) |
| *G06V 20/59* | (2022.01) |

(52) U.S. Cl.
CPC .............. *B60K 35/60* (2024.01); *B60K 35/80* (2024.01); *G06V 20/588* (2022.01); *G06V 20/597* (2022.01); *B60W 2420/403* (2013.01); *B60W 2540/229* (2020.02); *B60W 2552/35* (2020.02); *B60W 2756/10* (2020.02)

(58) Field of Classification Search
CPC .... B60K 2360/1438; B60K 2360/1442; B60K 2360/1446; B60W 30/095; B60W 30/12; B60W 50/0098; B60W 50/16; B60W 2050/0065; B60W 2050/146; B60W 2420/403; B60W 2520/10; B60W 2540/221; B60W 2540/229; B60W 2552/35; B60W 2556/50; B60W 2756/10; G06V 20/588; G06V 20/597
See application file for complete search history.

(56) References Cited

U.S. PATENT DOCUMENTS

| | | | | |
|---|---|---|---|---|
| 2005/0252710 | A1* | 11/2005 | Akaba ................... | B60R 21/013 180/268 |
| 2009/0097038 | A1* | 4/2009 | Higgins-Luthman ........................ | B60G 17/019 356/602 |
| 2010/0280713 | A1* | 11/2010 | Stahlin ................... | B60W 50/16 701/1 |
| 2013/0110342 | A1* | 5/2013 | Wuttke ................ | B62D 15/029 701/23 |
| 2014/0253309 | A1* | 9/2014 | Faeuster ............... | B60W 50/16 340/438 |
| 2014/0346823 | A1* | 11/2014 | Stebbins ................ | B60Q 9/008 297/217.1 |
| 2015/0324049 | A1* | 11/2015 | Kies ...................... | G06F 3/0416 345/156 |
| 2016/0334871 | A1* | 11/2016 | Levesque .............. | G06F 1/1632 |
| 2016/0362116 | A1* | 12/2016 | Otsuka .............. | B60W 60/0051 |
| 2017/0160803 | A1* | 6/2017 | Hong ...................... | G06F 3/044 |
| 2018/0089901 | A1* | 3/2018 | Rober ................... | G06V 20/56 |
| 2019/0193754 | A1* | 6/2019 | Augst ...................... | B60Q 9/00 |
| 2019/0217829 | A1* | 7/2019 | Kim ........................... | B60T 7/22 |
| 2019/0367050 | A1* | 12/2019 | Victor .................. | G06V 20/597 |
| 2020/0349368 | A1* | 11/2020 | Mayster ............ | G01C 21/3644 |
| 2021/0237760 | A1* | 8/2021 | Tucker ............... | B60W 30/045 |

FOREIGN PATENT DOCUMENTS

| | | |
|---|---|---|
| DE | 102013222880 A1 | 5/2014 |
| DE | 102013204118 A1 | 9/2014 |
| DE | 112018000479 T5 | 10/2019 |
| DE | 102019003430 B3 | 6/2020 |
| EP | 3576074 A1 | 12/2019 |
| WO | 2013081533 A1 | 6/2013 |
| WO | 2020157175 A1 | 8/2020 |

OTHER PUBLICATIONS

Written Opinion corresponding to International Patent Application No. PCT/EP2022/055874, dated Jun. 24, 2022 (6 pages).

* cited by examiner

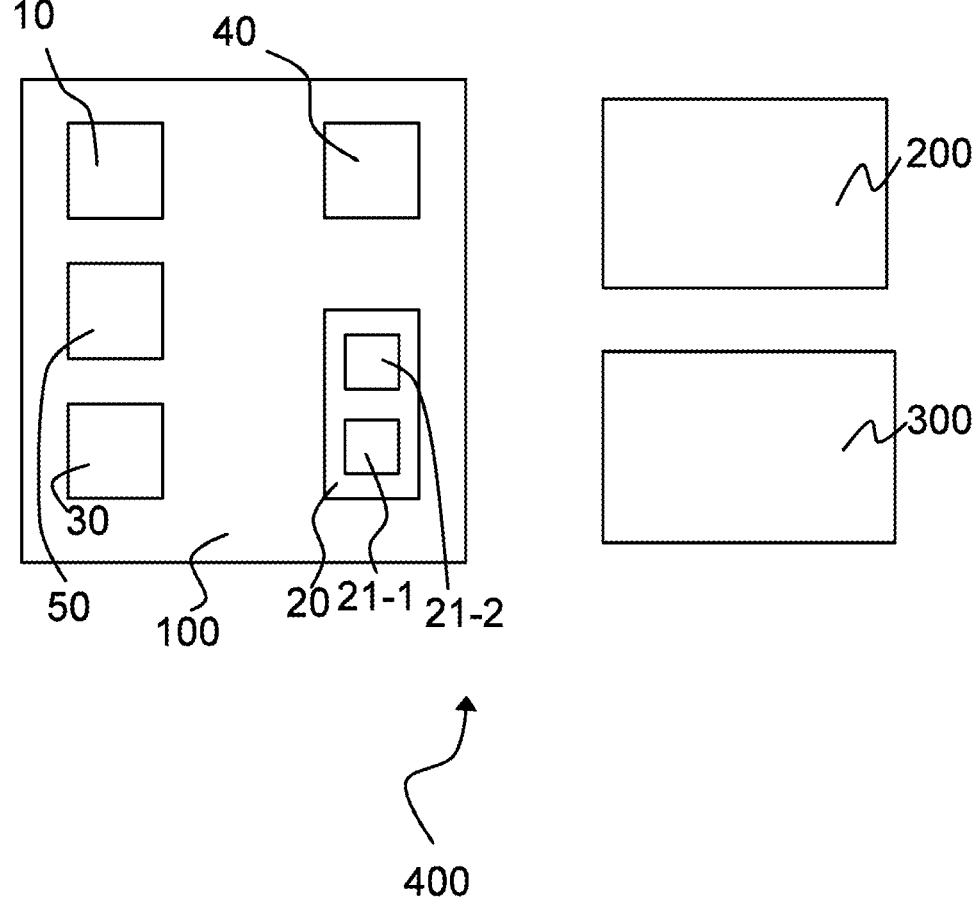

DEVICE FOR PRODUCING A SIGNAL WHICH CAN BE HAPTICALLY PERCEIVED BY A USER OF A VEHICLE

The present application is the U.S. national phase of PCT Application PCT/EP2022/055874 filed on Mar. 8, 2022, which claims priority of German patent application No. 102021114523.6 filed on Jun. 7, 2021, which is incorporated herein by reference in its entirety.

TECHNICAL FIELD

The present disclosure relates to generating signals which can be haptically perceived by a user of a vehicle.

BACKGROUND

For example, known devices for generating a signal which can be haptically perceived by a user of a vehicle have an actuator for generating the signal which can be haptically perceived by the user of the vehicle. Such known devices are coupled, for example, to an external apparatus which sends a triggering signal to the device when a predefined condition occurs, and the actuator generates the haptically perceptible signal when the triggering signal is received.

It is an object of the present invention to provide an improved device for generating a signal which can be haptically perceived by a user.

SUMMARY

This object, as well as others, are achieved by the features of at least some embodiments disclosed herein.

A device for generating a signal which can be haptically perceived by a user of a vehicle according to an embodiment includes a control device, a technical device, and a storage device. The control device is set up to communicate with an external apparatus and to receive a triggering signal from the external apparatus. The technical device for the vehicle has at least one actuator for generating the signal which can be haptically perceived by the user of the vehicle. The storage device stores a plurality of different patterns for controlling the at least one actuator depending on user-specific data and/or data relating to an environment of the technical device. The control device is set up to select one of the patterns stored in the storage device depending on a specific user and/or data relating to an environment of the technical device acquired by means of at least one acquisition device, and to control the at least one actor according to the selected pattern when it receives the triggering signal from the external apparatus.

As a result, when using different patterns with which the strength and/or length of the generated haptic signal which can be haptically perceived by the user is different, the signal which can be haptically perceived by the user can be adapted to different environmental conditions, different preferences and different user characteristics, for example. In this way, it is possible to prevent the user from not perceiving an excessively weak and/or short haptically perceptible signal, which could possibly lead to dangerous situations due to further distraction of the driver. In addition, the user can set a specific pattern of the haptically perceptible signal according to his preferences, which can result in increased user comfort.

According to an embodiment, the at least one acquisition device is in the form of an image acquisition device which is set up to acquire an image of the environment of the technical device, and the control device is set up to select the pattern based on the image of the environment of the technical equipment.

According to at least some embodiments, the image acquisition device is set up to acquire an image of the user, wherein the control device is set up to determine a degree of distraction of the user based on the image of the user, a plurality of different patterns for controlling the actuator depending on a degree of distraction of the user are stored in the storage device, and the control device is set up select the pattern according to the degree of distraction determined.

For example, the control device can be set up to identify the eyes of the user, for example with image recognition software, to determine the viewing angle of the user based on this, and to determine the degree of distraction based on the viewing angle. Depending on the determined degree of distraction, for example, a strong haptically perceptible signal can be generated when the degree of distraction is high, or a weak haptically perceptible signal can be generated when the degree of distraction is low.

According to some embodiments, the image acquisition device is set up to acquire an image of a road ahead of the vehicle, wherein the control device is set up to determine the condition of the road based on the image of the road, in particular to determine whether the road is even or uneven, and to select the pattern depending on the determined condition of the road. Depending on the determined condition of the road, for example, a strong haptically perceptible signal is generated when it is determined that the road is uneven, or a weak haptically perceptible signal is generated when it is determined that the road is even.

Here the acquisition/determination of the road as well as the condition thereof can also be carried out with the image recognition software, for example.

According to some embodiments, the control device is set up to detect a pothole in front of the vehicle based on the image of the road, and to control the at least one actuator according to the selected pattern only when the vehicle has passed the pothole.

Here the detection of the pothole can also be carried out with the image recognition software, for example.

In some embodiments, the at least one acquisition device has a device for determining the current position of the vehicle, in particular a GPS device, and a storage device in which the position data of courses of roads and the conditions thereof are stored, wherein the control device is set up, based on the current position of the vehicle, to determine a section of a road ahead of the vehicle, in particular immediately in front of the vehicle, currently being travelled by the vehicle and the condition thereof, and to select the pattern based on the condition determined. Depending on the determined condition of the section of the road, for example, a strong haptically perceptible signal can be generated if it is determined that the section of the road is uneven, or a weak haptically perceptible signal can be generated if it is determined that the section of the road is even.

The user-specific data can contain an age of the user, wherein the control device is set up to select the pattern depending on the age. Here the strength and/or length of the haptically perceptible signal can increase with increasing age, for example.

According to some embodiments, the plurality of patterns for controlling the at least one actuator contain a plurality of frequencies for controlling the at least one actuator and/or a plurality of amplitudes for controlling the at least one actuator and/or a plurality of time delays which determine the time after receiving the triggering signal at which the control device controls the at least one actuator according to the selected pattern.

According to some embodiments, the device also has a communication device, which is set up to communicate with an external communication device in order to retrieve external user-specific data stored in the external communication device and to store the data in the storage device as the user-specific data.

Here the external communication device may be in the form of a smartphone or tablet, for example.

The technical device can be in the form of a seat for the vehicle, a display unit for the vehicle, a control element for the vehicle, a steering wheel for the vehicle, or a seat belt for the vehicle.

The at least one actuator can be in the form of a motor with an eccentric rotating mass, an electromagnetic actuator, in particular a linear resonance actuator, a piezo actuator, an electroactive polymer, a shape memory alloy, or a shape memory polymer, or is set up to alter a coefficient of friction between a touch screen of a technical device in the form of a display unit and a finger of a user by altering a surface structure of the touch screen.

A system for generating a signal which can be haptically perceived by a user of a vehicle has, according to one embodiment, a device described above for generating a signal which can be haptically perceived by a user of a vehicle and an external apparatus.

According to embodiments, the external apparatus is in the form of a lane departure warning system and is set up to detect when the vehicle is leaving the lane and to send the triggering signal to the device for generating a signal which can be haptically perceived by a user of a vehicle when the lane departure warning system detects that the vehicle is leaving the lane.

According to some embodiments, the technical device is in the form of a seat for the vehicle, a steering wheel for the vehicle, or a seat belt for the vehicle and has a first and a second actuator, wherein the lane departure warning system is set up to detect whether the vehicle is leaving the lane towards the left or towards the right, and depending on whether the vehicle is leaving the lane towards the left or towards the right, to output a triggering signal for controlling the first actuator or a triggering signal for controlling the second actuator.

Here, for example, the first actuator can be on the left-hand side in the direction of travel and the second actuator on the right-hand side, wherein the haptically perceptible signal is generated by the first actuator when the vehicle is leaving the lane towards the left, and the haptically perceptible signal is generated by the second actuator when the vehicle is leaving the lane towards the right.

According to some embodiments, the external apparatus is in the form of a navigation system, wherein the technical device is in the form of a seat for the vehicle, a steering wheel for the vehicle, or a seat belt for the vehicle, and has a first and a second actuator, and the navigation system is set up, depending on whether the vehicle or the driver thereof is to turn left or right as part of route navigation, to output a triggering signal for controlling the first actuator or a triggering signal for controlling the second actuator.

For example, the first actuator can be placed on a left-hand side in the direction of travel and the second actuator on a right-hand side, wherein the haptically perceptible signal is generated by the first actuator when the vehicle or the driver thereof is to turn to the left, and the haptically perceptible signal is generated by the second actuator when the vehicle or the driver thereof is to turn to the right.

The external apparatus can be a collision assistant which is set up to detect an imminent collision with a vehicle ahead, wherein the technical device is in the form of a steering wheel for the vehicle or a seat belt for the vehicle, and the collision assistant is set up to output a triggering signal in the event of an imminent collision with a vehicle ahead for controlling at least one actuator in order to generate a vibration of the steering wheel or to tighten the seat belt.

According to some embodiments, a vehicle, in particular an electric or hybrid vehicle, has a device described above for generating a signal which can be haptically perceived by a user of a vehicle or a system described above for generating a signal which can be haptically perceived by a user of a vehicle.

Further advantageous developments result from the following description of preferred embodiments.

BRIEF DESCRIPTION OF THE DRAWING

FIG. 1 shows a system for generating a signal which can be haptically perceived by a user of a vehicle according to one embodiment.

DETAILED DESCRIPTION

FIG. 1 shows a system for generating a signal which can be haptically perceived by a user of a vehicle according to one embodiment.

The system 400 has a device 100 for generating a signal which can be haptically perceived by a user of a vehicle according to one embodiment, an external apparatus 200, which is in the form, for example, of a lane departure warning system or a navigation system or a collision assistant, or any other technical device provided for in a vehicle which is set up to provide the user with situational information, in particular related to the driving situation, by means of an audio output and/or a visual output, and an external communication device 300, which is in the form of a smartphone or tablet, for example.

The device 100 has a control device 10 which is set up to communicate with the external apparatus 200 and to receive a triggering signal from the external apparatus 200.

The device 100 also has a technical device 20 for the vehicle, which can be in the form, for example, of a seat for the vehicle, a display unit for the vehicle, a control element for the vehicle, a steering wheel for the vehicle, or a seat belt for the vehicle, and which has at least one actuator 21-1, 21-2, in the present case a first actuator 21-1 and a second actuator 21-2, for generating the signal which can be haptically perceived by the user of the vehicle.

The at least one actuator 21-1, 21-2 can be in the form, for example, of a motor with an eccentric rotating mass, an electromagnetic actuator, in particular a linear resonance actuator, a piezo actuator, an electroactive polymer, a shape memory alloy or a shape-memory polymer, or can be set up to alter a coefficient of friction between a touch screen of a technical device in the form of a display unit and a finger of a user by altering a surface structure of the touch screen.

In addition, the device 100 has a storage device 30 in which a plurality of different patterns for controlling the at least one actuator 21-1, 21-2 depending on user-specific data and/or data relating to an environment of the technical device 20 are stored. The plurality of patterns for controlling the at least one actuator 21-1, 21-2 can contain a plurality of frequencies for controlling the at least one actuator 21-1, 21-2 and/or a plurality of amplitudes for controlling the at least one actuator 21-2, 21-2 and/or a plurality of time delays which determine the time after receiving the triggering signal after which the control device 10 controls the at least one actuator 21-2, 21-2 according to the selected pattern.

The control device 10 is set up to select one of the patterns stored in the storage device 10 depending on a specific user and/or data relating to an environment of the technical device 20 and acquired by means of at least one acquisition device 40, which may be part of the device 100 or a component of a system 400 external to the device 100, and to control the at least one actuator 21-1, 21-2 according to the selected pattern when it receives the triggering signal from the external apparatus 200.

The at least one acquisition device 40 may be in the form of an image acquisition device, such as a camera, which is set up to acquire an image of the environment of the technical device 20. In this case, the control device 10 is set up to select the pattern based on the image of the environment of the technical device 20.

The image acquisition device may be set up to acquire an image of the user, wherein the control device 10 is set up to determine the degree of distraction of the user, based on the image of the user, in particular the eyes or the line of sight thereof or the viewing angle, using image recognition software stored in the storage device 30. In this case, a plurality of different patterns for controlling the actuator 21-1, 21-2 depending on the degree of distraction of the user are stored in the storage device 30, and the control device 10 is set up to select the pattern according to the determined degree of distraction.

Alternatively or additionally, the image acquisition device may be set up to acquire an image of a road ahead of the vehicle, wherein the control device 10 is set up, for example by using the image recognition software, to determine the condition of the road based on the image of the road and to select the pattern depending on the determined condition of the road.

The control device 10 may be set up to detect a pothole in front of the vehicle based on the image of the road, for example using the image recognition software, and to control the at least one actuator 21-1, 21-2 according to the selected pattern only when the vehicle has passed the pothole.

The at least one acquisition device 40 may have, in addition or alternatively, a device for determining the current position of the vehicle, in particular a GPS device, and a storage device in which position data of courses of roads and the conditions thereof are stored. In this case, the control device 10 is set up to determine, based on the current position of the vehicle, section of a road in front of the vehicle, in particular directly in front of the vehicle, currently being travelled by the vehicle and the condition thereof, and to select the pattern based on the determined condition. Depending on the determined condition of the section of road, for example, a strong haptically perceivable signal may be generated when it is determined that the section of the road is uneven, or a weak haptically perceivable signal may be generated when it is determined that the section of the road is even.

For example, the user-specific data stored in the storage device 30 may contain an age of the user. In this case, the control device 10 is set up to select the pattern depending on the age.

The device 100 may also have a communication device 50 which is set up to communicate with the external communication device 300 to retrieve user-specific data stored in the external communication device 50 and to store the data in the storage device 30 as the user-specific data.

The external apparatus 200, which is in the form of a lane departure warning system, can be set up to detect when the vehicle is leaving the lane and to send the triggering signal to the device when the lane departure warning system detects that the vehicle is leaving the lane.

In particular, in this case, the technical device 20 can be in the form of a seat for the vehicle, a steering wheel for the vehicle, or a seat belt for the vehicle and can have a first and a second actuator 21-1, 21-2, wherein the lane departure warning system is set up to detect whether the vehicle is leaving the lane towards the left or right and, depending on whether the vehicle is leaving the lane towards the left or right, to output a triggering signal for controlling the first actuator 21-1 or a triggering signal for controlling the second actuator 21-2.

Similarly, in particular in the case in which the external apparatus 200 is in the form of a navigation system, the technical device 20 may be in the form of a seat for the vehicle, a steering wheel for the vehicle, or a seat belt for the vehicle, and may have a first and a second actuator 21-1, 21-2, wherein the navigation system is set up, depending on whether the vehicle is to turn left or right as part of route navigation, to output a triggering signal for controlling the first actuator 21-1 or a triggering signal for controlling the second actuator 21-2.

In the case in which the external apparatus 200 is in the form of a collision assistant, which is set up to detect an imminent collision with a vehicle ahead, the technical device 20 may, for example, be in the form of a steering wheel for the vehicle or a seat belt for the vehicle, wherein the collision assistant is set up to output a triggering signal in the event of an imminent collision with a vehicle ahead for controlling the at least one actuator 21-1, 21-2 to generate a vibration of the steering wheel and/or to tighten the seat belt.

The invention claimed is:

1. A device for generating a signal which can be haptically perceived by a user of a vehicle, comprising:
   a control device configured to communicate with an external apparatus and to receive a triggering signal from the external apparatus;
   a technical device for the vehicle with at least one actuator for generating the signal which can be haptically perceived by the user of the vehicle, and
   a storage device storing a plurality of different patterns for controlling the at least one actuator depending on at least one of the group consisting of user-specific data and data relating to an environment of the technical device,
   wherein the control device is configured to select a selected pattern of the plurality of patterns stored in the storage device depending on at least one of the group consisting of the user-specific data and on the data relating to an environment of the technical device, and to control the at least one actuator according to the selected pattern upon receiving the triggering signal from the external apparatus,
   wherein the data relating to the environment is acquired using at least one acquisition device,
   wherein the at least one acquisition device comprises an image acquisition device that is configured to acquire an image of the environment of the technical device, including an image of a road ahead of the vehicle, wherein the control device is configured to determine the condition of the road based on the image of the road and to select the selected pattern depending on the condition of the road determined, and wherein the control device is configured to detect a pothole in front of the vehicle based on the image of the road, and to control the at least one actuator according to the selected pattern only when the vehicle has passed the pothole.

2. The device as claimed in claim 1, wherein:

the control device is configured to select the selected pattern at least in part depending on the data relating to an environment of the technical device.

3. The device as claimed in claim 1, wherein:

the image acquisition device is configured to acquire an image of the user;

the control device is configured to determine a degree of distraction of the user based on the image of the user;

the plurality of different patterns includes a second plurality of different patterns for controlling the actuator depending on a degree of distraction of the user are stored in the storage device; and the control unit is configured to select a selected pattern of said second plurality of different patterns according to the degree of distraction determined.

4. The device as claimed in claim 1, wherein the at least one acquisition device is configured to determine a current position of the vehicle and includes a storage device in which position data of courses and conditions of roads are stored, and wherein the control device is configured, based on the current position of the vehicle, to determine a section in front of the vehicle of a road currently being travelled by the vehicle and a condition thereof, and to select the selected pattern based on the determined condition.

5. The device as claimed in claim 1, wherein the user-specific data includes an age of the user, and the control device is configured to select the selected pattern depending on the age.

6. The device as claimed in claim 1, wherein the plurality of patterns for controlling the at least one actuator includes at least one of the group consisting of a plurality of frequencies for controlling the at least one actuator, a plurality of amplitudes for controlling the at least one actuator, and a plurality of time delays which determine the period of time after which the control device controls the at least one actuator according to the selected pattern after receiving the triggering signal.

7. The device as claimed in claim 1, further comprising a communication device configured to communicate with an external communication device in order to retrieve user-specific data stored in the external communication device and to provide the data in the storage device as the user-specific data.

8. The device as claimed in claim 7, wherein the technical device comprises a seat for the vehicle, a display unit for the vehicle, a control element for the vehicle, a steering wheel for the vehicle, or a seat belt for the vehicle.

9. The device as claimed in claim 1, wherein the technical device comprises a seat for the vehicle, a display unit for the vehicle, a control element for the vehicle, a steering wheel for the vehicle, or a seat belt for the vehicle.

10. The device as claimed in claim 1, wherein the at least one actuator comprises a motor with an eccentric rotating mass, an electromagnetic actuator, a linear resonance actuator, a piezo actuator, an electroactive polymer, a shape memory alloy, or a shape memory polymer.

11. The device as claimed in claim 1, wherein the at least one actuator is configured to alter a coefficient of friction between a touch screen of a display unit and a finger of a user by altering a surface structure of the touch screen.

12. A system for the generation of a signal which can be haptically perceived by a user of a vehicle, comprising:

a device as claimed in claim 1; and the external apparatus.

13. The system as claimed in claim 12, wherein the external apparatus comprises a lane departure warning system that is configured to detect when the vehicle is leaving a lane and to send the triggering signal to the device for generating a signal which can be haptically perceived by a user of a vehicle when the lane departure warning system detects that the vehicle is leaving the lane.

14. The system as claimed in claim 12, wherein the technical device comprises a seat for the vehicle, a steering wheel for the vehicle, or a seat belt for the vehicle, the technical device includes a first actuator and a second actuator, and the lane departure warning system is configured to detect whether the vehicle is leaving the lane towards left or right and, depending on whether the vehicle is leaving the lane towards the left or right, to selectively output a triggering signal for controlling the first actuator or a triggering signal for controlling the second actuator.

15. The system as claimed in claim 12, wherein:

the external apparatus comprises a navigation system;

the technical device comprises a seat for the vehicle, a steering wheel for the vehicle, or a seat belt for the vehicle;

the technical device and has a first and a second actuator; and the navigation system is configured, depending on whether the vehicle is to turn to the left or right as part of route navigation, to selectively output a triggering signal for controlling the first actuator or a triggering signal for controlling the second actuator.

* * * * *